United States Patent [19]

Marubashi

[11] 4,170,613
[45] Oct. 9, 1979

[54] FLEXIBLE EPOXY RESIN COMPOSITION

[75] Inventor: Kiyonobu Marubashi, Ohmi, Japan

[73] Assignee: Denki Kagaku Kogyo Kabushiki Kaisha, Tokyo, Japan

[21] Appl. No.: 894,953

[22] Filed: Apr. 10, 1978

[51] Int. Cl.$^2$ .................. C08G 59/02; C08G 59/10; C08G 59/16; C08K 5/01

[52] U.S. Cl. ............. 525/403; 260/30.4 EP; 260/33.6 EP; 525/404; 525/408; 525/409

[58] Field of Search ........... 260/837 R, 836, 33.6 EP, 260/30.4 EP, 33.8 EP

[56] References Cited

U.S. PATENT DOCUMENTS

| | | | |
|---|---|---|---|
| 3,697,619 | 10/1972 | Nagata et al. | 260/837 |
| 3,700,645 | 10/1972 | Fukuoka et al. | 260/29.7 H |
| 3,770,698 | 11/1973 | Riew | 260/837 R |
| 3,876,723 | 4/1975 | Strecker | 260/837 R |
| 4,025,578 | 5/1977 | Siebert | 260/837 R |
| 4,119,592 | 10/1978 | Murphy | 260/30.4 EP |

*Primary Examiner*—Herbert J. Lilling
*Attorney, Agent, or Firm*—Sughrue, Rothwell, Mion, Zinn and Macpeak

[57] ABSTRACT

A settable flexible epoxy resin composition comprising:

(A) 100 parts by weight of an epoxy resin, and
(B) 5 to 200 parts by weight of a liquid chloroprene copolymer having a number average molecular weight of about 500 to about 10,000 and prepared by copolymerizing
  70 to 99 parts by weight of (i) a chloroprene monomer or (ii) at least 50% by weight of a chloroprene monomer plus a monomer copolymerizable therewith, and
  1 to 30 parts by weight of one or more monomers selected from the group consisting of
    (a) an unsaturated glycidyl ester represented by the formula (I):

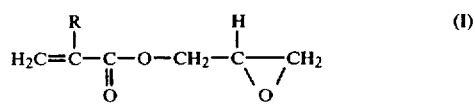

wherein R is a hydrogen atom, a methyl group or an ethyl group;
    (b) a polyfunctional acrylate or a polyfunctional methacrylate; and
    (c) an unsaturated carboxylic acid;

in the presence of 0.5 to 20 parts by weight of a mercaptocarboxylic acid based on 100 parts by weight of the monomers.

36 Claims, No Drawings

FLEXIBLE EPOXY RESIN COMPOSITION

BACKGROUND OF THE INVENTION

1. Field of the Invention

This invention relates to settable epoxy resin composition that has been rendered flexible by incorporating a novel liquid chloroprene copolymer therein.

2. Description of the Prior Art

Because of their good characteristics, epoxy resins are conventionally used in casrtings, impregnating agents, adhesives, sealants, paints, etc. However, since their cured product essentially has low flexibility, there has been a pressing need to improve the impact strength thereof and the ability to bond flexible materials therewith.

Two conventional types of agents can be used to render epoxy resins flexible: one agent is a non-reactive type agent such as a phthalic ester and chlorinated diphenyl, and the other agent is a reactive type agent such as a long-chain monoepoxy compound, a polyester having a terminal hydroxyl group, a polyamide resin, a liquid polysulfide polymer having a terminal mercapto group and liquid acrylonitrile-butadiene rubber (NBR) having a terminal carboxyl group. Reactive type agents are generally advantageous because they can render settable epoxy resins flexible without causing a significant deterioration in the properties of the resin to occur, and in particular, a polyamide resin, a liquid polysulfide polymer having a terminal mercapto group and liquid NBR having a terminal carboxyl group are widely used. However, a settable epoxy resin which has been rendered flexible by a polyamide resin is not sufficiently resilient to absorb an instantaneous impact or an impact at low temperature. If an eposy resin is rendered flexible using a liquid polysulfide polymer, the resin sets so fast in the presence of an amine compound, which is a typical curing agent for epoxy resins, that it becomes difficult to control the pot life of the epoxy resin and the cured resin does not have sufficient toughness. A flexible epoxy resin containing liquid NBR is less reactive at low temperatures, and so, if curing is at room temperature only a product with poor characteristics can be obtained.

SUMMARY OF THE INVENTION

Extensive research on agents for rendering epoxy resins flexible that can be blended with epoxy resins in proportions varying over a wide range and which can be cured in the presence of a conventional epoxy resin curing agent and under normal conditions for curing epoxy resins, have been made and it has been found that liquid chloroprene copolymers as described herein are advantageous over known agents with respect to their reactivity with epoxy resins at low temperatures and their ability to render epoxy resins flexible, thus providing a cured epoxy resin with resiliency, toughness, high impact resistance, high peeling strength after bonding, and retention of shear strength.

Therefore, an object of this invention is to provide a novel settable epoxy resin composition having improved impact strength and flexibility.

This and other objects of the invention are achieved by using a liquid chloroprene copolymer that is highly compatible with an epoxy resin and which can easily be cured together with the epoxy resin at low temperatures such as room temperature in the presence of a conventional curing agent for an epoxy resin.

The settable epoxy resin composition according to this invention comprises:

(A) 100 parts by weight of an epoxy resin, and
(B) 5 to 200 parts by weight of a liquid chloroprene copolymer having a number average molecular weight of about 500 to 10,000 and prepared by copolymerizing 70 to 99 parts by weight of (i) a chloroprene monomer or (ii) at least 50% by weight of a chloroprene monomer plus a monomer copolymerizable therewith, and 1 to 30 parts by weight of one or more monomers selected from the group consisting of (a) an unsaturated glycidyl ester represented by the formula (I):

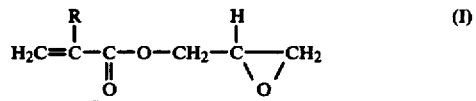

wherein R is a hydrogen atom, a methyl group or an ethyl group;

(b) a polyfunctional acrylate or polyfunctional methacrylate; and (c) an unsaturated carboxylic acid;

in the presence of 0.5 to 20 parts by weight of a mercaptocarboxylic acid based on 100 parts by weight of the monomers.

DETAILED DESCRIPTION OF THE INVENTION

The liquid chloroprene copolymer used in this invention is described below in detail.

Suitable examples of monomers which are copolymerizable with chloroprene monomer are those monomers containing an $H_2C=C<$ group and preferred specific examples of these copolymerizable monomers are styrene and styrene derivatives such as 2-, 3- and 4-chlorostyrene, 2-, 3- and 4-bromostyrene, 3-chloro-2-methylstyrene, 2,3-dichlorostyrene, 2,4-dimethylstyrene, 2-, 3- and 4-methoxystyrene and 2-, 3- and 4-ethoxystyrene, etc.; vinylpyridine derivatives such as 2-, 3- and 4-vinylpyridine, 5-ethylene-2-vinylpyridine and 2-methyl-5-vinylpyridine, etc.; acrylic esters such as methyl methacrylate, ethyl methacrylate, methyl acrylate, ethyl acrylate, butyl acrylate, butyl methacrylate, etc.; unsaturated nitriles such as acrylonitrile; and diene monomers such as isoprene, butadiene-1,3, 2,3-dimethylbutadiene, 1-chlorobutadiene-1,3, 2,3-dichlorobutadiene-1,3, 2-bromobutadiene-1,3, 2-fluorobutadiene-1,3 2-cyanobutadiene-1,3 2-phenylbutadiene-1,3 and 2-chloro-3-methylbutadiene-1,3, etc. These copolymerizable monomers are preferably used in an amount of less than about 50 wt% of the sum of chloroprene monomer and the copolymerizable monomers.

The mercaptocarboxylic acid used in this invention is a chain transfer agent for polymerization and has the function of introducing a carboxyl group into the resulting polymer. Any mercaptocarboxylic acid having at least one mercapto group and at least one carboxyl group in the molecule may be used for obtaining the liquid copolymer of this invention. Mercaptocarboxylic acids having 2 to 12 carbon atoms and containing one or two carboxyl groups in the molecule are suitable. Of these, monomercaptocarboxylic acids having 2 to 3 carbon atoms and containing one or two carboxyl groups in the molecule are particularly preferred. Examples of suitable mercaptocarboxylic acids are thioglycolic acid, 2-mercaptopropionic acid, thiolactic acid, thiomalic acid. etc. The mercaptocarboxylic acid is used in an amount of 0.5 to 20 parts, preferably 1 to 10 parts, by weight, per 100 parts by weight of the total monomers.

The unsaturated glycidyl ester (a) represented by the formula (I)

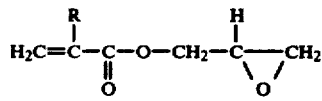

wherein R is as defined above, the polyfunctional acrylate pr polyfunctional methacrylate (b), and the unsaturated carboxylic acid (c) are monomers copolymerized with the chloroprene monomer or the chloroprene monomer and the other monomer copolymerizable with the chloroprene monomer and by copolymerizing these monomers with the chloroprene monomer their respective active terminal groups are introduced into the resulting copolymer; the unsaturated glycidyl ester introducing an epoxy group, the polyfunctional acrylate or methacrylate introducing an acrylate or methacrylate group respectively, and the unsaturated carboxylic acid introducing a carboxyl grou into the resulting copolymer.

Preferred polyfunctional acrylates or methacrylates are difunctional, trifunctional or tetrafunctional acrylates or methacrylates each represented by one of the following formulae (II) to (VII):

Difunctional:

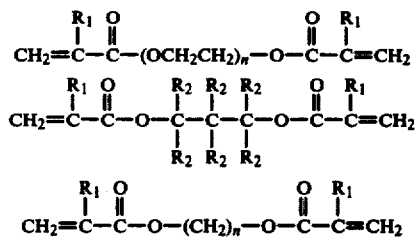

Trifunctional:

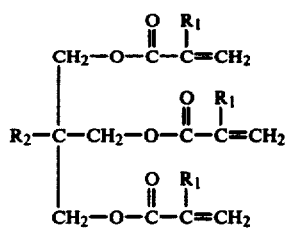

-continued

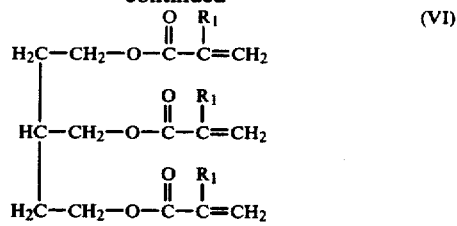

Tetrafunctional:

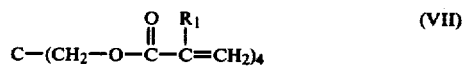

In each of the above formulae (II) to (VII), $R_1$ is a hydrogen atom or an alkyl group (e.g., an alkyl group having 1 to 12 carbon atoms such as a methyl group, an ethyl group, a propyl group, a butyl group, a lauryl group, etc.), $R_2$ is a hydrogen atom, an alkyl group (e.g., an alkyl group having 1 to 12 carbon atoms such as a methyl group, an ethyl group, a propyl group, a butyl group, a lauryl group, etc.), a haloalkyl group (e.g., a haloalkyl group having 1 to 12 carbon atoms in which the halogen atom is F, Cl, Br and I, such as a chloromethyl group, a trichloromethyl group, a bromoethyl group, a dibromoethyl group, etc.), a halogen atom (e.g., a halogen atom, such as F, Cl, Br and I), or a hydroxyalkyl gorup (e.g., a hydroxyalkyl group having 1 to 12 carbon atoms such as a hydroxymethyl group, a hydroxyethyl group, a hydroxypropyl group, etc.), and n is an integer of 1 to 20.

Typical examples of difunctional acrylate or methacrylate monomers which can be used in this invention are ethylene glycol dimethacrylate, triethylene glycol dimethacrylate, tetraethylene glycol dimethacrylate, polyethylene glycol dimethacrylate (wherein the polyethylene glycol usually has a molecular weight of less than about 200), 1,4-butanediol diacrylate, 1,3-butylene glycol dimethacrylate, 1,3-butylene glycol diacrylate, 1,6-hexanediol diacrylate; typical examples of trifunctional acrylate or methacrylate monomers which can be used in this invention are trimethylolpropane trimethacrylate and trimethylolpropane triacrylate; and typical examples of tetrafunctional acrylate or methacrylate monomers which can be used in this invention are pentaerythritol tetraacrylate and pentaerythritol tetramethacrylate.

Examples of suitable unsaturated carboxylic acids which can be used in this invention are those, e.g., having 3 to 8 carbon atoms and an ethylenically unsaturated bond in the molecule such as acrylic acid, methacrylic acid, itaconic acid, crotonic acid, isocrotonic acid, α-methyl crotonic acid, 4-pentenoic acid, 4-hexenoic acid, 4-heptenoic acid, 2-octenoic acid and vinyl acetic acid.

One or more functional monomers selected from the group consisting of the unsaturated glycidyl ester (a), the polyfunctional acrylate or methacrylate (b) and the unsaturated carboxylic acid (c) may be used. These functional monomers may be used in an amount of 1 to 30 parts, preferably 1 to 20 parts, by weight for 70 to 99 parts by weight of the chloroprene monomer or the chloroprene monomer plus the copolymerizable monomer. Use of less than 1 part by weight of these functional monomers produces a liquid copolymer which has low compatibility with an epoxy resin and which results in the epoxy resin curing slowly. Use of more than 30 parts by weight is not only uneconomical but the resulting liquid copolymer has low storage stability although good compatibility with an epoxy resin results and the curability with the epoxy resins is good. Further, when a chloroprene monomer is used with another monomer copolymerizable therewith at least 50% by weight of the 70 to 99 parts by weight used with the 1 to 30 parts by weight of monomers (a), (b) and/or (c) must be chloroprene monomer. If the amount of chloroprene monomer is less than 50% by weight of the 70 to 99 parts by weight, the ability of the liquid polymer obtained to render the epoxy resin cured product flexible is deteriorated.

The polymerization reaction for producing the copolymer of this invention can be accelerated by usual free radical reaction mechanisms, and so, naturally, conventional radical polymerization techniques, e.g., as disclosed in J. C. Bevington, *Radical Polymerization*, Academic Press Inc. (1961); and G. E. Ham, *Copolymerization*, Interscience (1964), concerning time, temperature and other reaction conditions as well as selection of polymerization initiators can be used. Typical examples of polymerization initiators which can be used e.g., in amounts of about 0.1 to 10% by weight based on the weight of the monomer(s) used, are azo compounds such s azobisisobutyronitrile, 2,2'-azobis-(2,4-dimethylvaleronitrile), 2,2'-azobis-(4-methoxy-2,4-dimethylvaleronitrile), 2-phenylazo-2,4-dimethyl-4-methoxyvaleronitrile, 2-cyano-2-propyleneazoformaldehyde, etc.; peroxides such as benzoyl peroxide, lauroyl peroxide, p-chlorobenzyl peroxide, acetyl peroxide, etc. The polymerization reaction is usually carried out at a temperature in the range of about 0 to about 150° C. The preferred temperature will vary depending on the monomers used.

The conversion of the monomers to polymers is preferably to an extent of about 40 to about 90%, and more preferably to an extent of about 60 to about 80%.

Any type of polymerization reaction, for example, bulk polymerization (e.g., as disclosed in U.S. Pat. No. 1,950,432), solution polymerization (e.g., as disclosed in U.S. Pat. No. 3,919,281) and emulsion polymerization (e.g., as disclosed in U.S. Pat. No. 3,849,371) can be used to produce the liquid chloroprene monomer, but from the standpoint of the homogeniety of the polymerization system, the viscosity of the polymeric liquid, and the method of isolation of the resulting copolymer, solution polymerization is especially preferred.

In solution polymerization, the solvent is preferably selected from the group consisting of aromatic hydrocarbons, aliphatic halogenated hydrocarbons and cyclic ethers. The liquid copolymer of this invention is viscous and it is rather difficult to completely remove the solvent from the polymeric solution. Therefore, a solvent having a boiling point of less than about 150° C. is preferably used. Typical examples of suitable solvents that can be used in this invention are benzene, toluene, xylene, carbon tetrachloride, chlorform, tetrahydrofuran and dioxane. The amount of the solvent used preferably ranges from about 20 to about 200 parts by weight on the basis of 100 parts by weight of the total monomers. If the amount of solvent is too small, control of temperature due to the heat generated becomes difficult, and if the amount of the solvent is too large, the rate of reaction tends to decrease.

The chloroprene copolymer to be used in this invention is liquid and has a number average molecular weight in the range of from about 500 to about 10,000, preferably from about 1,000 to about 5,000. If the molecular weight of the polymer is too low, cured products of the copolymer with the epoxy resin have poor flexibility. If the molecular weight of the copolymer is too high, the viscosity of the copolymer is increased to such an extent that it becomes difficult to blend the copolymer with an epoxy resin. The chloroprene copolymer is a sol type polymer that completely dissolves in toluene and has an inherent viscosity $[\eta]$ of from about 0.03 to about 0.3 dl/g as measured in toluene at 30° C.

The chloroprene copolymer invariably has at least one carboxyl group per molecule on the average. In addition, the chloroprene copolymer has 0.5 to 2.5 epoxy groups per molecule on the average if the function monomer is an unsaturated glycidyl ester. If the functional monomer is a polyfunctional acrylate or methacrylate, the average number of acrylate or methacrylate monomer units combined in the resulting copolymer is 0.15 to 2.5 The number of acrylate or methacrylate monomer units can be reduced if a higher functional acrylate or methacrylate monomer is employed. If the functional monomer is an unsaturated carboxylic acid, 0.5 to 2 additional carboxyl groups per molecule may be present in the copolymer on the average so that the total number of carboxyl groups is 1.5 to 3 per molecule on the average. If the number of functional groups present in the chloroprene copolymer is less than the above defined range, the copolymer has low compatibility with the epoxy resin and a low curability of the epoxy resin results. If the number of functional groups is larger than the range set forth above, the copolymer may cause the epoxy resin to set rapidly but the above cured epoxy resin product is not sufficiently flexible.

The epoxy resin composition of this invention contains 5 to 200 parts by weight of the liquid chloroprene copolymer described above and 100 parts by weight of an epoxy resin. Use of less than 5 parts by weight of the liquid chloroprene copolymer does not lead to a substantial improvement in the flexibility of the cured epoxy resin product, whereas use of more than 200 parts by weight of the chloroprene copolymer contributes to a significant decrease in the mechanical strength of the cured epoxy resin product, although the epoxy resin product may have high flexibility. A particularly good balance beween flexibility and strength of the cured epoxy resin product is obtained if the composition contains 20 to 100 parts by weight of the liquid chloroprene copolymer for 100 parts by weight of the epoxy resin. This formulation is most preferred if the composition is used as an adhesive, because this formulation provides a good balance between the adhesive strength under shear and the adhesive strength on peeling of the cured epoxy resin product.

Any kind of epoxy resin can be used in this invention, but epoxy resins having an epoxy equivalent on the order of 100 to 1,000 and which are liquid at room temperature (about 20°-30°C.) are preferred. Typical examples of preferred epoxy resins are bisphenol A type epoxy resins such as condensation products of bisphenol A and epichlorohydrin, aromatic ester type epoxy resins such as condensation products of oxybenzoic acid and epichlorohydrin, alicyclic ester type epoxy resins such as Unox BP-201 (cyclohexene type, trade name, produced by UCC), and novolak type epoxy resins such as epoxy-phenol novolak condensates.

The composition of this invention can be cured with an epoxy resin curing agent. Any conventional epoxy resin curing agents may be used, for example, aliphatic or aromatic polyamines such as diethylene triamine, tetraethylene pentamine, xylylene diamine, N,N-dimethyl propane diamine, 4,4'-diaminodiphenyl methane, n-phenylene diamine, 2,4,6-tris(dimethylaminomethyl)phenol, polyamides such as a condensation product of dimeric acid and a polyamine, polymercaptans, polycarboxylic acid anhydrides such as hexahydrophthalic anhydride and methyl nadic anhydride, and $BF_3$-monoethyl amine complex compounds. These curing agents may be used in combination with conventional curing accelerators such as benzyl dimethyl amine, dimethylaminomethylphenol, 2,4,6-tris(dimethylaminomethyl)phenol and 2-ethyl-4-methylimidazole.

The amount of the curing agent to be used depends on the kind of curing agent used, but usually, about 5 to about 150 parts by weight for 100 parts by weight of the composition of this invention containing an epoxy resin and the liquid chloroprene copolymer can be advantageously used. Curing may be accelerated by using about 0.5 to about 5 parts by weight of any of the above described curing accelerators. A desired rate of curing can be obtained by appropriately selecting the kind and amount of curing agent as well as the curing accelerator, the kind of liquid chloroprene copolymer, and the curing temperature.

The composition of this invention can be cured under conventional curing conditions for ordinary epoxy resins, and the curing temperature generally ranges from room temperature to about 200° C.

The advantage of the composition of this invention is that the composition of this invention provides a better modified epoxy resin than when typical epoxy resin modifiers such as a liquid butadiene/acrylonitrile copolymer having a terminal carboxyl group and a liquid polysulfide polymer having a terminal mercapto group are used. In particular, the composition rapidly develops strength on curing at room temperature and produces high adhesive strength after curing under heating.

By selecting a suitable curing agent, a wide variety of products can be prepared from the composition of this invention, ranging from a product that easily sets at room temperature to a thermosetting product. Therefore, the composition of this invention can be used as an adhesive, a coating material, a lining material, a sealing medium, a potting material, a paint, a waterproof film material, a compounding material and a modifier for resins and rubber. The composition of this invention is especially useful as a high-performance cold-setting adhesive.

This invention is now described in greater detail by reference to the following examples. Unless otherwise stated, all percentages, parts, ratios and the like are by weight.

EXAMPLE 1

(1) Production of Liquid Chloroprene Copolymer

A mixture of the monomers listed in Table 1 below, the mercaptocarboxylic acids listed in Table 1 below and toluene charged in a reaction vessel with a stirrer was heated to 55° C., and 1.5 parts of a toluene solution containing 0.5 parts of $\alpha,\alpha'$-azobis-2,4-dimethylvaleronitrile was added to the mixture to initiate polymerization. The polymerization continued at 55° C. and when a predetermined degree of conversion to polymer was obtained, 1 part of a toluene solution containing 0.02 part of p-tert-butylcatechol was added to short-shop the polymerization.

To each of the copolymer solutions was added a large excess of methanol to precipitate and isolate the copolymer, which was then purified by dissolving the copolymer in benzene and solidifying and precipitating the copolymer from methanol. This procedure of purification was repeated three times. Then, the remaining solvent was removed using a thin film evaporator at 100° C. under 1-2 mm Hg abs to isolate the liquid copolymers. The residual solvent in each copolymer obtained was less than 0.1%.

Infrared absorption spectrum analysis showed a characteristic absorption at 1700 to 1730 $cm^{-1}$ due to the carboxyl group for the copolymers obtained by using the mercaptocarboxylic acid and/or the unsaturated carboxylic acid, and a weak absorption in the neighborhood of 910 $cm^{-1}$ due to the epoxy group for the copolymers obtained using glycidyl methacrylate.

Table 1 below shows the characteristics of each copolymer obtained, such as the number average molecular weight and viscosity of the copolymer. In Table 1, Copolymer Nos. O, P, Q, R, and S are controls.

Table 1

| Co-Polymer No. | Chloroprene | Copolymerizable Monomer | Unsaturated Glycidyl Ester | Polyfunctional (Meth)Acrylate | Unsaturated Carboxylic Acid | Chain Transfer Agent (parts) | | Conversion to Polymer (%) |
|---|---|---|---|---|---|---|---|---|
| A | 95 | — | Glycidyl methacrylate 5 | — | — | Thioglycolic acid | 3.0 | 78.5 |
| B | 90 | DCBD 4 | Glycidyl methacrylate 6 | — | — | Thioglycolic acid | 2.0 | 79.4 |
| C | 85 | — | Glycidyl methacrylate 10 | — | Methacrylic acid 5 | Thioglycolic acid | 1.8 | 78.3 |
| D | 85 | Isoprene 5 | Glycidyl methacrylate 10 | — | — | 2-Mercaptopropionic acid | 7.5 | 80.1 |
| E | 67 | Isoprene 30 | — | TMPTA 3 | — | Thioglycolic acid | 5.0 | 74.0 |
| F | 90 | — | — | EDMA 10 | — | Thioglycolic acid | 1.0 | 72.5 |
| G | 90 | DCBD 4 | — | TMPTA 6 | — | Thioglycolic acid | 3.0 | 75.7 |
| H | 80 | Styrene 15 | — | TMPTA 5 | — | 2-Mercaptopropionic acid | 1.2 | 73.6 |
| I | 95 | — | — | PETA 5 | — | 2-Mercaptopropionic acid | 2.0 | 77.1 |
| J | 95 | — | — | — | Methacrylic acid 5 | Thioglycolic acid | 2.8 | 73.6 |
| K | 90 | DCBD 5 | — | — | Methacrylic acid 5 | Thioglycolic acid | 1.0 | 73.2 |
| L | 90 | DCBD 4 | — | — | Methacrylic acid 6 | 2-Mercaptopropionic acid | 5.8 | 72.5 |
| M | 90 | DCBD 4 | — | — | Methacrylic | Thioglycolic acid | 5.5 | 66.6 |

Table 1-continued

| | | | | | | | | | |
|---|---|---|---|---|---|---|---|---|---|
| N | 90 | DCBD 5 | — | — | acid 6<br>Methacrylic<br>acid 5 | Thiomalic acid | 9.0 | 72.9 | |
| O | 95 | — | Glycidyl methacrylate 5 | — | — | n-DDM | 3.3 | 72.5 | |
| P | 100 | — | — | — | — | Thioglycolic acid | 1.5 | 75.0 | |
| Q | 95 | — | — | TMPTA 5 | — | n-DDM | 3.3 | 73.8 | |
| R | 100 | — | — | — | — | 2-Mercaptopropionic acid | 2.0 | 73.3 | |
| S | 98 | — | — | — | Methacrylic<br>acid 2 | n-DDM | 2.5 | 76.1 | |

| | Polymer | | | | |
|---|---|---|---|---|---|
| Copolymer<br>No. | Number Average<br>Molecular Weight | Inherent<br>Viscosity [η] | Number of<br>Carboxyl Groups<br>per Molecule | Number of<br>Epoxy Groups<br>per Molecule | Number of Combined (Meth)-<br>Acrylate Monomer Units<br>per Molecule |
| A | 2,700 | 0.104 | 1.11 | 1.12 | — |
| B | 2,840 | 0.097 | 1.10 | 1.40 | — |
| C | 3,120 | 0.116 | 2.13 | 2.50 | — |
| D | 2,200 | 0.065 | 1.09 | 1.80 | — |
| E | 1,750 | 0.060 | 1.04 | — | 0.25 |
| F | 4,800 | 0.167 | 1.21 | — | 1.69 |
| G | 2,530 | 0.863 | 1.18 | — | 0.475 |
| H | 3,540 | 0.149 | 1.11 | — | 0.485 |
| I | 3,400 | 0.132 | 1.16 | — | 0.377 |
| J | 2,800 | 0.090 | 2.05 | — | — |
| K | 4,600 | 0.181 | 2.69 | — | — |
| L | 1,850 | 0.074 | 1.94 | — | — |
| M | 1,560 | 0.068 | 1.70 | — | — |
| N | 1,520 | 0.051 | 2.49 | — | — |
| O | 3,450 | 0.119 | 0 | 1.43 | — |
| P | 3,300 | 0.108 | 1.07 | — | — |
| Q | 3,380 | 0.124 | 0 | — | 0.77 |
| R | 3,410 | 0.121 | 0.94 | — | — |
| S | 4,370 | 0.157 | 0.45 | — | — |

(Notes)
1 The abbreviations used have the following meaning
DCBD : 2,3-Dichlorobutadiene-1,3
TMPTA : Trimethylolpropane trimethacrylate
EDMA : Ethylene glycol dimethacrylate
PETA : Pentaerythritol tetraacrylate
n-DDM : n-Dodecyl mercaptan
2 Number average molecular weight was measured using vapor pressure osmometry.
3 Inherent viscosity [η] was measured in toluene at 30° C.
4 Number of carboxyl groups per molecule = $\frac{0.01 \times (\text{carboxyl group content (\%)}) \times (\text{number average molecular weight})}{45}$ To determine the carboxyl group content of each polymer, the polymer was dissolved in a solvent mixture of toluene and methyl ethyl ketone, and the solution was titrated with 0.05 N potassium hydroxide using an auto-potentiometric titration.
5 The number of epoxy groups per molecule was determined from the average molecular weight of the polymer and the glycidyl methacrylate content in the copolymer based on the conversion of monomers to polymer and the reactivity of chain transfer agent determined by gas chromatography.
6 The number of combined (meth)acrylate monomer units per molecule was determined from the average molecular weight of the copolymer and the polyfunctional acrylate or methacrylate content in the copolymer calculated based on the conversion of the polyfunctional acrylate or methacrylate to copolymer determined by thin layer chromatography plus the conversion of other monomers to copolymer and the reactivity of chain transfer agent determined by gas chromatography.
7 Conversion to polymer was measured as the degree (%) of conversion of all monomers to polymer.

(2) Compatibility Evaluation

A mixture of equal amounts of an epoxy resin ("Epikote 828" manufactured by Shell Chemical Co.; as described below) and each of the liquid copolymers produced in (1) above was charged into a test tube and the mixture was allowed to stand overnight at 70° C. Table 2 below shows the compatibility of the two components of each sample. The liquid copolymers of this invention had good compatibility with epoxy resin, whereas the controls, Copolymers O, P, Q, R and S, separated from the epoxy resin.

Note: "Epikote 828" is an epoxy resin analogous to a condensation product of bisphenol A (or a condensation product of 2 phenol molecules and acetone) and epichlorohydrin. The general formula of the epoxy resin is as follows:

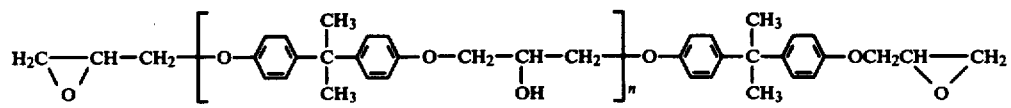

epoxy equivalent: 190

Table 2

| Liquid<br>Copolymer | Condition of Mixture<br>after Standing Overnight at 70° C. |
|---|---|
| A | Homogeneous transparent liquid |
| B | " |
| C | " |
| D | " |
| E | " |
| F | " |
| G | " |
| H | " |
| I | " |
| J | " |
| K | " |
| L | " |
| M | " |

Table 2-continued copolymers other than those listed in Table 3 below were also cured to produce flexible sheets.

Table 3

| Copoly-mer No. | Epoxy Resin (tradename) | Curing Agent Name | Amount | Cured Product |
|---|---|---|---|---|
| A | Epikote 828 | Xylylene diamine | 20 | Pale yellow, transparent, flexible sheet |
| A | " | Tohmide 255 | 50 | Pale yellowish brown, transparent, flexible sheet |
| B | " | Tohmide ZS-2 | 50 | Yellow, translucent, flexible sheet |
| B | " | Dimethylpropane diamine | 15 | Yellowish brown, translucent, flexible sheet |
| C | " | 2,4,6-tris(Dimethylaminomethyl)phenol | 20 | Pale yellow, transparent, flexible sheet |
| E | " | Xylylene diamine | 20 | Pale yellow, transparent, flexible sheet |
| E | " | Tohmide 255 | 50 | Pale yellowish brown, transparent, flexible sheet |
| F | " | Tohmide ZS-2 | 50 | Yellow, translucent, flexible sheet |
| F | " | Dimethylpropane diamine | 15 | Yellowish brown, translucent, flexible sheet |
| J | " | Xylylene diamine | 20 | Pale yellow, transparent, flexible sheet |
| J | " | Tohmide 255 | 50 | Pale yellowish brown, transparent, flexible sheet |
| J | Epiclon 730 | Xylylene diamine | 25 | Pale yellow, transparent, flexible sheet |
| J | DER 332 | Dimethylpropane diamine | 15 | Yellowish brown, translucent, flexible sheet |
| K | Epikote 828 | Xylylene diamine | 20 | Pale yellow, transparent, flexible sheet |
| K | " | Tohmide ZS-2 | 50 | Yellow, translucent, flexible sheet |
| K | " | Tohmide 235A | 25 | Pale yellow, transparent, flexible sheet |
| M | " | 2,4,6-tris(Dimethylaminomethyl)phenol | 20 | Pale yellow, transparent, flexible sheet |

(Notes)
(1) Amount of a curing agent = parts by weight per 100 parts by weight of "epoxy resin plus liquid chloroprene copolymer".
(2) Epoxy resins
"Epiclon 730": A polyol-glycidyl ether type epoxy resin, manufactured by Dai-Nippon Ink & Chemicals Co.; epoxy equivalent: 165
"DER 332": A bisphenol A type epoxy resin, manufactured by Dow Chemical International & Chemicals Co.; epoxy equivalent: 174.
(3) Curing agents
"Tohmide 255": Polyamide curing agent having an amine value of 710, manufactured by Fuji Kasei Kogyo K.K.
"Tohmide ZS-2": A polythiourea curing agent having an amine value of 480, manufactured by Fuji Kasei Kogyo K.K.
"Tohmide 235A": A polyamide curing agent having an amine value of 350, manufactured by Fuji Kasei Kogyo K.K.

| Liquid Copolymer | Condition of Mixture after Standing Overnight at 70° C. |
|---|---|
| N | " |
| O | Separated into two phases |
| P | Partially separated into two phases |
| Q | Separated into two phases |
| R | Partially separated into two phases |
| S | Separated into two phases |

(3) Curing Evaluation

Blends of the various liquid copolymers prepared in (1) above and the epoxy resin (as shown in Table 3 below) were prepared at a weight ratio of 3:1 (epoxy resin to liquid copolymer). The blends were cured overnight at 20° C. with varying amounts of the epoxy resin curing agents listed in Table 3 below. As the results in Table 3 below show, the compositions of this invention produced cured products of good quality. The epoxy resin compositions containing the liquid chloroprene copolymers other than those listed in Table 3 below were also cured to produce flexible sheets.

EXAMPLE 2

Blends with the liquid copolymers prepared in Example 1 and having the formulation specified below

| Formulation | parts |
|---|---|
| Epoxy Resin (Epikote 828) | 100 |
| Liquid Chloroprene Copolymer | (as shown in Table 4) |
| Polyamide Curing Agent (Tohmide 235A, amine value: 350) | 20 | were heated at 70° C. for a day and further heated at 150° C. for 2 hours to form transparent cured sheets.

These cured sheets were subjected to flexural strength testing in accordance with ASTM D790-66. The results of the flexural strength testing are shown in Table 4 below.

Table 4

| Run No. | Liquid Copolymer No. | Amount (parts) | Deflection (mm) | Maximum Flexure Stress (kg/mm$^2$) | Flexural Strength (kg/mm$^2$) |
|---|---|---|---|---|---|
| 1 | None (Control) | 0 | 13.0 | 10.2 | 8.52 |
| 2 | B | 5 | 16.7 | 8.42 | 6.70 |
| 3 | B | 25 | 24.0 | 6.83 | 5.04 |
| 4 | B | 50 | Not broken[1] | 3.03 | Not broken |
| 5 | B | 100 | " | 0.46 | " |
| 6 | B | 200 | " | 0.08 | " |
| 7 | E (Control) | 50 | Measurement[2] Impossible | Measurement Impossible | Measurement Impossible |
| 8 | G | 25 | 23.5 | 6.75 | 4.87 |
| 9 | G | 50 | Not broken | 2.80 | Not broken |
| 10 | G | 100 | " | 0.57 | " |
| 11 | I | 50 | " | 0.66 | " |
| 12 | Q (Control) | 50 | Measurement Impossible | Measurement Impossible | Measurement Impossible |
| 13 | L | 5 | 18.2 | 8.24 | 6.30 |
| 14 | L | 25 | 26.4 | 6.24 | 4.95 |
| 15 | L | 50 | Not broken | 3.25 | Not broken |
| 16 | L | 100 | " | 0.81 | " |

Table 4-continued

| Run No. | Liquid Copolymer No. | Amount (parts) | Deflection (mm) | Maximum Flexure Stress (kg/mm²) | Flexural Strength (kg/mm²) |
|---|---|---|---|---|---|
| 17 | L | 200 | " | 0.12 | " |
| 18 | N (Control) | 50 | Measurement Impossible | Measurement Impossible | Measurement Impossible |

(Notes)
[1] Not broken - the test piece could be deflected more than 30 mm and did not break, under the measurement conditions specified.
[2] Measurement impossible - the liquid copolymer separated from the epoxy resin during curing and a homogeneous test piece was not produced and thus measurement was not possible.

EXAMPLE 3

The composition of this invention were cured at 70° C. for one day and further cured at 150° C. for 2 hours. The cured products were subjected to Du Pont impact testing. Table 5 below shows the formulations of the compositions and the results obtained. Liquid copolymers C, I and J prepared in Exampled 1 were used.

The degree of destruction of the test pieces was evaluated on the following basis:

A: The test piece broke into pieces and the pieces scattered.
B: The test piece broke into only 2 or 3 pieces and the pieces did not scatter.
C: The weight did not completely break the test piece and only a hole in the test piece at the position of impact resulted.

Table 5

| Run No. | Formulation (parts) | | | | Impact Test | |
|---|---|---|---|---|---|---|
| | Liquid Copolymer | Epoxy Resin | Curing Agent | Load (g) | Drop Height (cm) | Degree of Destruction |
| 1 | C | 30 | 100 | 20 | 300 | 70 | B |
| 2 | C | 50 | 100 | 20 | 300 | 70 | B |
| 3 | C | 100 | 100 | 20 | 300 | 70 | C |
| 4 | C | 200 | 100 | 20 | 300 | >100 | C |
| 5 | I | 30 | 100 | 20 | 300 | 60 | B |
| 6 | I | 50 | 100 | 20 | 300 | 70 | B |
| 7 | I | 100 | 100 | 20 | 300 | 70 | C |
| 8 | I | 200 | 100 | 20 | 300 | >100 | C |
| 9 | J | 30 | 100 | 60 | 500 | 50 | B |
| 10 | J | 50 | 100 | 60 | 500 | 70 | B |
| 11 | J | 100 | 100 | 60 | 1000 | 100 | C |
| 12 | J | 200 | 100 | 60 | 1000 | 100 | C |
| 13 | None | 0 | 100 | 20 | 300 | 45 | A |
| 14 | None | 0 | 100 | 30 | 300 | 50 | A |
| 15 | None | 0 | 100 | 60 | 300 | 80 | A |
| 16 | None | 0 | 100 | 70 | 300 | 60 | A |

(Notes)
Epoxy Resin : "Epikote 828"
Curing Agent : "Tohmide 235A"

EXAMPLE 4

Blends containing liquid chloroprene Copolymers D and H prepared in Example 1 and various epoxy resins were prepared at a weight ratio of 4:1 (epoxy resin to liquid chloroprene copolymer). The blends were mixed with varying amounts of epoxy resin curing agents. The compositions obtained were heated at 150° C. for 60 minutes to produce tough cured products. Table 6 shows the results of Du Pont impact testing on these cured products performed under the same conditions as used in Example 3.

Table 6

| Run No. | 1 | 2 | 3 | 4 | 5 | 6 |
|---|---|---|---|---|---|---|
| Epoxy Resin | Epiclon 200[1] | Epiclon 400[2] | Epiclon 850[3] | Epiclon 200 | Epiclon 400 | Epiclon 850 |
| Liquid Chloroprene Copolymer | D | D | D | H | H | H |
| Curing Agent (parts)[4] | | | | | | |
| N,N-Dimethylpropane Diamine | 15 | — | — | 15 | — | — |
| Versamid 125[5] | — | 50 | — | — | 50 | — |
| Methyl Nadic Anhydride | — | — | 80 | — | — | 80 |
| Benzyl Dimethyl Amine | — | — | 1 | — | — | 1 |
| Impact Testing[6] | | | | | | |
| Drop Height (cm) | 65 | 70 | 55 | 60 | 65 | 55 |
| Degree of Destruction | B | B | B | B | B | B |

(Notes)
[1] An aromatic ester type epoxy resin having an epoxy equivalent of 176 (manufactured by Dai-Nippon Ink & Chemicals Co.)
[2] An alicyclic ester type epoxy resin having an epoxy equivalent of 180 (manufactured by Dai-Nippon Ink & Chemicals Co.)
[3] A bisphenol A type epoxy resin having an epoxy equivalent of 190 (manufactured by Dai-Nippon Ink & Chemicals Co.)
[4] Parts by weight per 100 parts by weight of a blend of the epoxy resin plus the liquid chloroprene copolymer.
[5] A polyamide curing agent having an amine value of 330 to 360 (manufactured by Dai-Ichi General K.K.)
[6] Load was 300 kg.

EXAMPLE 5

The performance of blends prepared using to the formulation shown below

| Formulation | parts |
|---|---|
| "Epokote 828" | 100 |
| Liquid Copolymer (prepared in Example 1) as in Table 6 below | 50 |
| "Tohmide 235" | 65 | were evaluated as a cold-setting adhesive. Table 7 shows the results of this evaluation. In Run No. 3 a copolymer of 1,3-butadiene and acrylonitrile and commercially available as a good agent for rendering general-purpose epoxy resins flexible was substituted for the liquid copolymer of this invention. Only an epoxy resin and a curing agent was used in Run No. 4.

Table 7

| Run No. | 1 | 2 | 3 | 4 |
|---|---|---|---|---|
| Liquid Copolymer No. | J | N | Liquid NBR | None |
| Adhesive Strength[1] | | | | |
| Adhesive Strength under Shear[2] (kg/cm$^2$) | 109 | 103 | 32.0 | 105 |
| Adhesive Strength in Peeling[3] (kg/cm) | 7.6 | 7.7 | 2.1 | 0.6 |

(Notes)
[1]Curing conditions: 20° C. × 24 hr (common to all runs)
[2]Substrate: Steel plate
[3]Substrate: Cotton canvas
[4]Tradename "Hycar CTBN 1300 × 8"(manufactured by B. F. Goodrich) for a copolymer of 1,3- butadiene and acrylonitrile, having a number average molecular weight of 3,400 and 1.9 carboxyl groups per molecule on the average.

EXAMPLE 6

Blends of the formulations shown in Table 8 below were cured under the conditions shown in Table 8 below and subjected to adhesion testing using the same adherends as employed in Example 5. The results obtained are shown in Table 8 below. Liquid chloroprene Copolymer L prepared in Example 1 was used in in Run No. 1, commercially available liquid NBR as described Example 5 was used in Run No. 2, and no copolymer was used in Run No. 3. Table 8 shows that the product obtained by curing the composition of this invention at a high temperature was so flexible and tough that the product exhibited high peeling strength as well as high shear strength.

Table 8

| Run No. | 1 | 2 | 3 |
|---|---|---|---|
| Formulation (parts) | | | |
| "Epikote 828" | 100 | 100 | 100 |
| Copolymer L | 50 | 0 | 0 |
| Liquid NBR | 0 | 50 | 0 |
| Hexahydrophthalic Anhydride | 80 | 80 | 80 |
| Benzyl Dimethyl Amine | 1 | 1 | 1 |
| Curing Conditions | 150° C. × 1.5Hr | 150° C. × 1.5Hr | 150° C. × 1.5Hr |
| Adhesive Strength | | | |
| Adhesive Strength under Shear (kg/cm$^2$) | 192 | 76.9 | 173 |
| Adhesive Strength in Peeling (Kg/cm) | 9.2 | 3.4 | 0.2 |

EXAMPLE 7

Blends prepared using liquid chloroprene Copolymers B and G prepared in Example 1 of the formulation indicated below

| | Formulation |
|---|---|
| | parts |
| "Epikote 828" | 100 |
| Liquid Copolymer | as shown in Table 9 |
| "Tohmide 235A" | 60 |

Curing conditions: 70° C.×24 hr, followed by 15° C.×2 hr were tested for adhesive strength under shear (substrates: steel plates) and for flexural strength under the same conditions as in Example 2. The results are shown in Table 9 below. Run Nos. 7, 8 and 9 are controls. The table clearly shows that the composition of this invention is not only flexible but has improved adhesive strength.

Table 9

| Run No. | (Liquid Copolymer) (parts) | | Adhesive Strength (kg/m$^2$) | Deflection (mm) | Flexural Strength (kg/mm$^2$) |
|---|---|---|---|---|---|
| 1 | Copolymer | B (25) | 668 | Not broken | 4.2 |
| 2 | " | (50) | 1,025 | " | 4.4 |
| 3 | " | (100) | 1,063 | " | 2.5 |
| 4 | " | G (25) | 637 | " | 4.0 |
| 5 | " | (50) | 710 | " | 4.3 |
| 6 | " | (100) | 1,085 | " | 2.3 |
| 7 (control) | " | P (50) | 295 | 16.0 | 3.8 |
| 8 (control) | " | R (50) | 298 | 15.5 | 4.3 |
| 9 (control) | none | (0) | 588 | 15.7 | 7.0 |

While the invention has been described in detail and with reference to specific embodiments thereof, it will be apparent to one skilled in the art that various changes and modifications can be made therein without departing from the spirit and scope thereof.

What is claimed is:

1. A settable flexible epoxy resin composition comprising:
(A) 100 parts by weight of an epoxy resin, and
(B) 5 to 200 parts by weight of a liquid chloroprene copolymer having a number average molecular weight of about 500 to about 10,000 and prepared by free radical copolymerizing
70 to 99 parts by weight of (i) a chloroprene monomer or (ii) at least 50% by weight of a chloroprene monomer plus a monomer copolymerizable with chloroprene, and 1 to 30 parts by weight of one or more monomers selected from the group consisting of
(a) an unsaturated glycidyl ester represented by the formula:

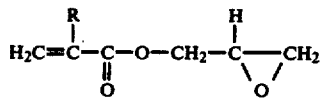

Wherein R is a hydrogen atom, a methyl group or an ethyl group;
(b) a polyfunctional acrylate or a polyfunctional methacrylate; and
(c) an unsaturated carboxylic acid;

in the presence of 0.5 to 20 parts by weight of a mercaptocarboxylic acid based on 100 parts by weight of the monomers.

2. The composition according to claim 1, wherein the mercaptocarboxylic acid is thioglycolic acid.

3. The composition according to claim 1, wherein the mercaptocarboxylic acid is thiomalic acid.

4. The composition according to claim 1, wherein the mercaptocarboxylic acid is 2-mercaptopropionic acid.

5. The composition according to claim 1, wherein the monomer copolymerizable with the chloroprene monomer contains an $H_2C=C<$ group.

6. The composition according to claim 1, wherein the monomer copolymerizable with the chloroprene monomer is a diene monomer.

7. The composition according to claim 1, wherein the monomer copolymerizable with the chloroprene monomer is 2,3-dichlorobutadiene-1,3.

8. The composition according to claim 1, wherein the monomer copolymerizable with the chloroprene monomer is isoprene.

9. The composition according to claim 1, wherein the monomer copolymerizable with the chloroprene monomer is styrene.

10. The composition according to claim 1, wherein the mercaptocarboxylic acid is present in an amount of 1 to 10 parts by weight per 100 parts by weight of the total monomers.

11. The composition according to claim 1, wherein the polyfunctional methacrylate is trimethylolpropane trimethacrylate.

12. The composition according to claim 1, wherein the polyfunctional methacrylate is ethylene glycol dimethacrylate.

13. The composition according to claim 1, wherein the polyfunctional acrylate is pentaerythritol tetraacrylate.

14. The composition according to claim 1, wherein the unsaturated glycidyl ester is glycidyl methacrylate.

15. The composition according to claim 1, wherein the unsaturated carboxylic acid is methacrylic acid.

16. The composition according to claim 1, wherein the degree of conversion to polymer ranges from 40 to 90%.

17. The composition according to claim 1, wherein the liquid chloroprene copolymer is produced by copolymerizing at a temperature in the range of about 0 to about 150° C.

18. The composition according to claim 1, wherein the liquid chloroprene copolymer is produced by copolymerization in the presence of a solvent.

19. The composition according to claim 18, wherein the solvent has a boiling point of about 150° C. or less.

20. The composition according to claim 18, wherein the solvent is selected from the group consisting of toluene, benzene, xylene, carbon tetrachloride, chloroform, tetrahydrofuran and dioxane.

21. The composition according to claim 18, wherein the solvent is present in an amount of from 20 to 200 parts by weight per 100 parts by weight of the total monomers.

22. The composition according to claim 1, wherein the liquid chloroprene copolymer has an inherent viscosity $[\eta]$ of 0.03 to 0.3 dl/g as measured in toluene at 30° C.

23. The composition according to claim 1, wherein the liquid chloroprene copolymer is a sol type polymer completely soluble in toluene.

24. The composition according to claim 1, wherein the liquid chloroprene copolymer contains one or more carboxyl groups and 0.5 to 2.5 epoxy groups on the average per molecule.

25. The composition according to claim 1, wherein the liquid chloroprene copolymer contains one or more carboxyl groups and 0.15 to 2.5 acrylate and/or methacrylate monomer units on the average per molecule.

26. The composition according to claim 1, wherein the liquid chloroprene copolymer contains 1.5 to 3 carboxyl groups on the average per molecule.

27. The composition according to claim 1, wherein the liquid chloroprene copolymer is present in an amount of 20 to 100 parts by weight per 100 parts by weight of the epoxy resin.

28. An adhesive comprising the composition according to claim 27.

29. The composition according to claim 1, wherein the epoxy resin has an epoxy equivalent in the range of 100 to 1,000.

30. The composition according to claim 1, wherein the epoxy resin is selected from the group consisting of a bisphenol A type epoxy resin, an aromatic ester type epoxy resin, an alicyclic ester type epoxy resin and a novolak type epoxy resin.

31. A settable resin composition comprising the composition according to claim 1, and a curing agent selected from the group consisting of an aliphatic polyamine, an aromatic polyamine, a polyamide, a polycarboxylic anhydride, and a BF$_3$-monoethylamine complex compound.

32. The composition according to claim 31, wherein the curing agent is selected from the group consisting of diethylene triamine, tetraethylene pentamine, xylylene diamine, N,N-dimethylpropane diamine, 4,4'-diaminodiphenylmethane, m-phenylene diamine, and 2,4,6-tris(dimethylaminomethyl)phenol.

33. The composition according to claim 31, wherein the curing agent is a condensation product of dimeric acid and polyamine.

34. The composition according to claim 31, wherein the curing agent is selected from the group consisting of a polymercaptan, hexahydrophthalic anhydride and methyl nadic anhydride.

35. The composition according to claim 31, wherein the curing agent is present in an amount of 5 to 150 parts by weight per 100 parts by weight of the total amount of the liquid chloroprene copolymer and the epoxy resin.

36. The composition according to claim 31, additionally containing a curing accelerator selected from the group consisting of benzyl dimethyl amine, dimethylaminomethylphenol, 2,4,6-tris(dimethylaminomethyl)phenol, and 2-ethyl-4-methyl imidazole.

* * * * *